United States Patent
Ryu et al.

(10) Patent No.: US 8,391,167 B2
(45) Date of Patent: Mar. 5, 2013

(54) METHOD TO PRECISELY AND SECURELY DETERMINE PROPAGATION DELAY AND DISTANCE BETWEEN SENDING AND RECEIVING NODE IN PACKET NETWORK AND PACKET NETWORK NODE SYSTEM FOR EXECUTING THE METHOD

(75) Inventors: Hyun Surk Ryu, Suwon-si (KR); Geoffrey M. Garner, Red Bank, NJ (US); Cornelis Johannis Den Hollander, Yongin-si (KR); Fei Fei Feng, Yongin-si (KR); Kyu Hong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 11/702,644

(22) Filed: Feb. 6, 2007

(65) Prior Publication Data

US 2007/0189187 A1    Aug. 16, 2007

Related U.S. Application Data

(60) Provisional application No. 60/772,282, filed on Feb. 11, 2006.

(30) Foreign Application Priority Data

Sep. 5, 2006  (KR) .................. 10-2006-0084994

(51) Int. Cl.
*H04J 3/14* (2006.01)
(52) U.S. Cl. ........ 370/252; 375/224; 375/225; 375/226; 375/227; 375/228

(58) Field of Classification Search .................. 370/241, 370/252; 375/224–228
See application file for complete search history.

(56) References Cited

U.S. PATENT DOCUMENTS

| | | | |
|---|---|---|---|
| 5,793,976 A * | 8/1998 | Chen et al. ................... 709/224 |
| 6,195,336 B1 * | 2/2001 | Stumer ......................... 370/238 |
| 7,327,693 B1 * | 2/2008 | Rivers et al. .................. 370/252 |
| 2002/0194361 A1 | 12/2002 | Itoh et al. |
| 2003/0034877 A1 * | 2/2003 | Miller et al. ................. 340/5.61 |
| 2003/0112753 A1 * | 6/2003 | Jo et al. ......................... 370/229 |
| 2003/0142651 A1 * | 7/2003 | Matta et al. .................... 370/338 |
| 2004/0114539 A1 * | 6/2004 | Beshai et al. .................. 370/254 |
| 2004/0153534 A1 | 8/2004 | Gibart et al. |
| 2005/0021737 A1 | 1/2005 | Ellison et al. |
| 2005/0138379 A1 * | 6/2005 | Semple et al. ................ 713/170 |
| 2006/0007863 A1 * | 1/2006 | Naghian ....................... 370/238 |
| 2007/0162979 A1 * | 7/2007 | Kamperman et al. .......... 726/27 |

FOREIGN PATENT DOCUMENTS

| | | |
|---|---|---|
| JP | 2003-087324 | 3/2003 |
| JP | 2004-128798 | 4/2004 |

* cited by examiner

*Primary Examiner* — Charles C Jiang
(74) *Attorney, Agent, or Firm* — NSIP Law

(57) ABSTRACT

A system and method for determining a propagation delay between nodes in a packet network are provided. The system and method include sending a ping packet from a source node to a destination node, determining an intermediate node delay of the ping packet at an intermediate node and recording the intermediate node delay in the ping packet and determining the propagation delay at the destination node by using the intermediate node delay.

20 Claims, 17 Drawing Sheets

METHOD TO PRECISELY AND SECURELY DETERMINE PROPAGATION DELAY AND DISTANCE BETWEEN SENDING AND RECEIVING NODE IN PACKET NETWORK AND PACKET NETWORK NODE SYSTEM FOR EXECUTING THE METHOD

CROSS-REFERENCE TO RELATED APPLICATIONS

This application claims the benefit under 35 U.S.C. §119(e) of U.S. patent application Ser. No. 60/772,282, filed on Feb. 11, 2006, in the U.S. Patent and Trademark Office, and claims the benefit under 35 U.S.C. §119(a) of Korean Patent Application No. 2006-84994, filed Sep. 5, 2006, in the Korean Intellectual Property Office, the entire disclosures of both of which are hereby incorporated by reference.

BACKGROUND OF THE INVENTION

1. Field of the Invention

The present invention relates to a method of precisely and securely determining a propagation delay between nodes in a packet network and a packet network node system executing the method. More particularly, the present invention relates to a method of determining a propagation delay of a ping packet excluding delay in intermediate nodes and determining a distance between nodes in a packet network having a synchronization signal capable of being used in each node.

2. Description of the Related Art

Applications provided via a packet network may require digital rights management (DRM). DRM is a bundling of technologies supporting generation, distribution, and management of contents, such as securely protecting rights and profits of content providers, preventing illegal copies, imposing fees, and supporting payment agencies. A digital rights management includes technology for enabling only a legal user to use contents, a software and security technology for approving and executing copyright, and payment technology for enabling payment of a suitable fee.

To acquire an application requiring DRM, a digital media player (hereinafter, referred to as a player node) may be connected to a digital media server (hereinafter, referred to as a server node) via a packet network. In this case, an owner of the application may want to provide and replay the application in a geographically limited area.

For example, an owner of digital video disc (DVD) contents may request the contents to be transmitted and replayed by users in a certain area and not to be transmitted or replayed out of the certain area. To execute this request, a server node providing the contents has to determine whether a player node exists within a threshold distance.

In a conventional technology, to determine a distance between a server node and a player node, the server node sends a ping packet to the player node, measures a round-trip time of the ping packet, and determines a distance between the server node and the player node.

Namely, the server node sends a ping packet and records a departure time of the ping packet. The player node responds to the server node via a response packet corresponding to the received ping packet. The server node computes a round-trip time of the ping packet by an arrival time of the response packet and the departure time of the ping packet. When the round-trip time is over a predetermined delay threshold, the server node determines that the player node is out of the threshold distance and does not establish a connection to send contents.

In the conventional technology, a ping packet and a response packet may have a serious queuing delay occurring at intermediate nodes. This delay also occurs when giving a priority to the ping packet and the response packet in a non-preemptive type packet network. In such a network, the ping packet or response packet is processed after processing a frame previously being transmitted before an arrival of the ping packet or response packet.

For example, with a maximum size Ethernet frame including 1518 bytes of payload in 100 Mbps Ethernet, a queuing delay of 121 microseconds may occur in one node. Specifically, even though a ping packet passes through a small number of intermediate nodes, a considerable amount of queuing time delay in the order of milliseconds may occur. In addition, the greater the number of intermediate nodes, the greater the amount of time of the total queuing delay.

Also, in the conventional technology, when a dedicated unit is not used or a highest pre-emptive priority for processing the ping packet is not given in a process of receiving a ping packet at a player node and sending a response packet corresponding to the ping packet at a server, an additional queuing delay may occur.

Considering a delay for propagating a signal in a typical local area network (LAN) or a wide area network (WAN) of 8 nanoseconds per meter, the delay with respect to 30-100 meters will be 240 to 800 nanoseconds, namely, a time less than 1 microsecond. Hence, the above queuing delay may greatly exceed the delay for propagating a signal over a threshold distance.

FIG. 1 is a diagram illustrating a conventional method of determining a propagation delay and a distance between nodes in a packet network. A server node 101 sends a ping packet 103 to a player node 102 to measure a distance between the server node 101 and the player node 102. In this case, the ping packet 103 may pass through one or more intermediate nodes 104. Though the ping packet 103 has a higher priority than other packets waiting to be sent at the intermediate node 104, a queuing delay occurs due to a packet being sent in a non-preemptive type packet network 100.

In this case, the ping packet 103 waits at the intermediate node 104 until sending of a packet 106 is completed, and therefore has the queuing delay greater than the propagation delay between nodes as described above. During the queuing delay, the ping packet may be stored in a storage 105.

To consider the queuing delay, a delay threshold in a packet network has to be established to be greater than a sum of propagation delays. However, determining a time limit for the delay threshold to be sufficient enough to avoid a refusal of providing a service to a legal user may cause a decrease in reliability of the packet network because a service may be provided to a player node beyond a threshold distance when the packet network is lightly loaded.

Accordingly, there exists a need for a method of precisely and securely measuring a propagation delay and a distance between nodes in a packet network, and a packet network node executing the method.

SUMMARY OF THE INVENTION

Exemplary embodiments of the present invention address at least the above problems and/or disadvantages and provide at least the advantages described below. Accordingly, an aspect of the present invention provides a method of precisely and securely determining a propagation delay and a distance between nodes in a packet network and a packet network node system executing the method.

An exemplary aspect of the present invention also provides a method and a system of determining a distance between a source node and a destination node of a ping packet by precisely determining a propagation delay between the source node and the destination node by removing intermediate node delay with respect to the ping packet traversing an intermediate node.

An additional exemplary aspect of the present invention provides a method and a system of accumulating link propagation delays of the links between adjacent nodes and storing to a ping packet, determining the total propagation delay by using the accumulated link propagation delays, and determining a distance between a source node and a destination node.

An additional exemplary aspect of the present invention provides a method and a system of appending a digital signature sent to an adjacent node to prevent an unauthorized modification with respect to a ping packet, to the ping packet or, instead of the ping packet, a follow-up packet in which a departure time and an intermediate node delay of the ping packet are recorded.

According to an exemplary aspect of the present invention, there is provided a method of determining a propagation delay between nodes in a packet network, the method including sending a ping packet from a source node to a destination node, determining an intermediate node delay of the ping packet at an intermediate node and recording the intermediate node delay in the ping packet and determining the propagation delay at the destination node by using the intermediate node delay.

An exemplary operation of sending a ping packet from a source node to a destination node may include determining a departure time that the ping packet departs, recording the departure time in a departure time field of the ping packet and sending the ping packet to the destination node.

An exemplary operation of determining an intermediate node delay of the ping packet at an intermediate node and recording the intermediate node delay in the ping packet may include receiving the ping packet and determining an intermediate node arrival time, determining an intermediate node departure time that the ping departs, determining the intermediate node delay by using a difference between the intermediate node departure time and the intermediate node arrival time and recording the intermediate node delays in a intermediate node delay field included in the ping packet.

An exemplary method may further include the operation of sending the ping packet to a successive intermediate node or the destination node.

In an exemplary embodiment, the intermediate node delay is accumulated in an accumulated delay field of the ping packet by the successive intermediate node or the destination node.

According to another exemplary aspect of the present invention, there is provided a method of determining a propagation delay between nodes in a packet network, the method including sending a ping packet from a source node to a destination node and determining and storing a departure time, recording the departure time in a departure time field of a follow-up packet and sending the follow-up packet to the destination node, determining an intermediate node delay of the ping packet at an intermediate node, recording the intermediate node delay in the follow-up packet and determining the propagation delay at the destination node, based on the ping packet and the follow-up packet.

According to still another exemplary aspect of the present invention, there is provided a method of determining a propagation delay between nodes in a packet network, the method including sending a ping packet from a source node to a destination node, recording, in the ping packet at an intermediate node, the link propagation delay of a link in a path as the ping packet traverses the network and determining the propagation delay at the destination node based on the link propagation delay.

BRIEF DESCRIPTION OF THE DRAWINGS

The above and/or other aspects and advantages of embodiments of the present invention will become apparent and more readily appreciated from the following detailed description, taken in conjunction with the accompanying drawings of which.

Throughout the drawings, the same drawing reference numerals will be understood to refer to the same elements, features, and structures.

DETAILED DESCRIPTION OF EXEMPLARY EMBODIMENTS

Figure 1:
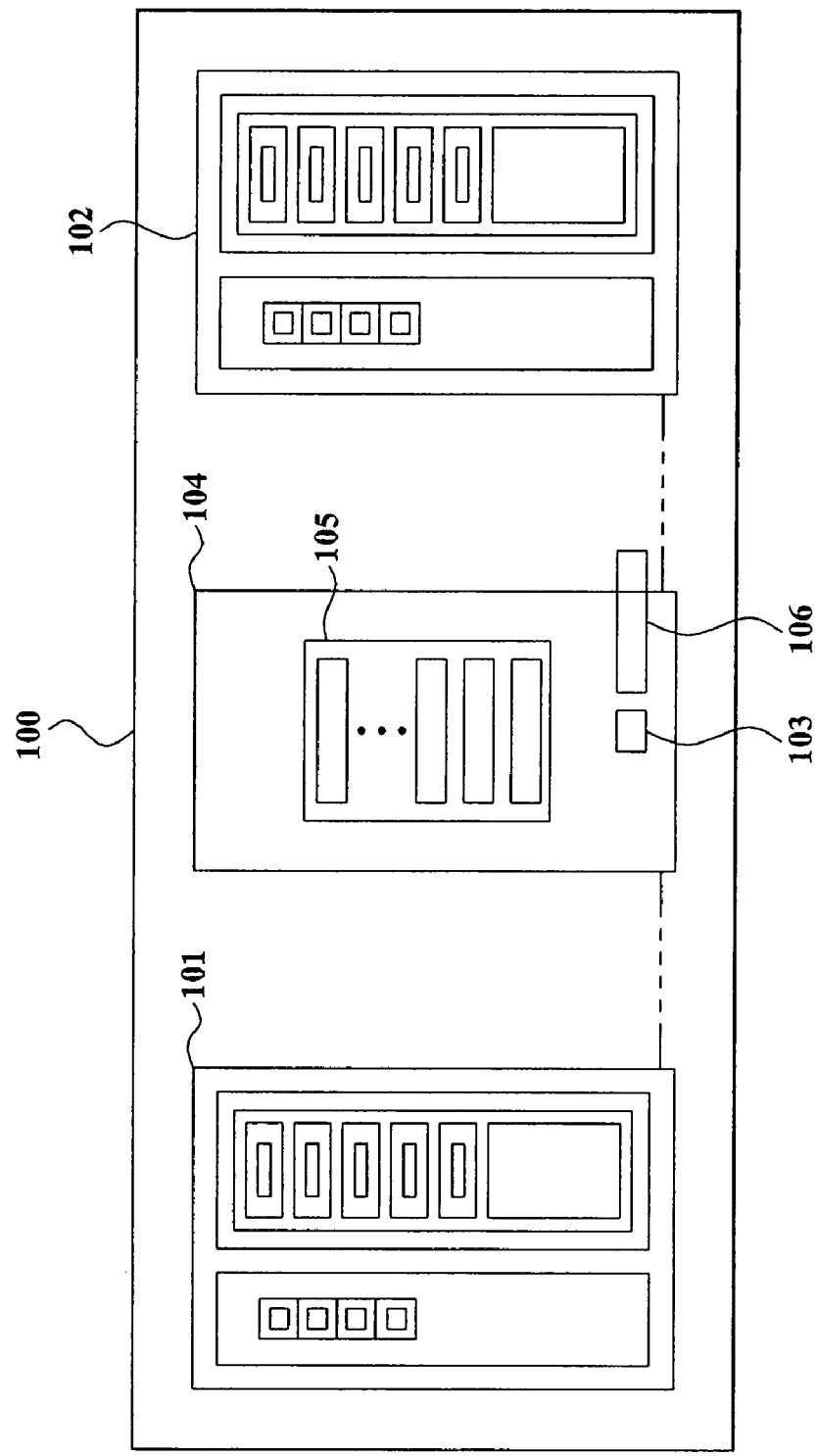
FIG. 1 is a diagram illustrating a conventional method of determining a propagation delay and a distance between nodes in a packet network.
Figure 2:
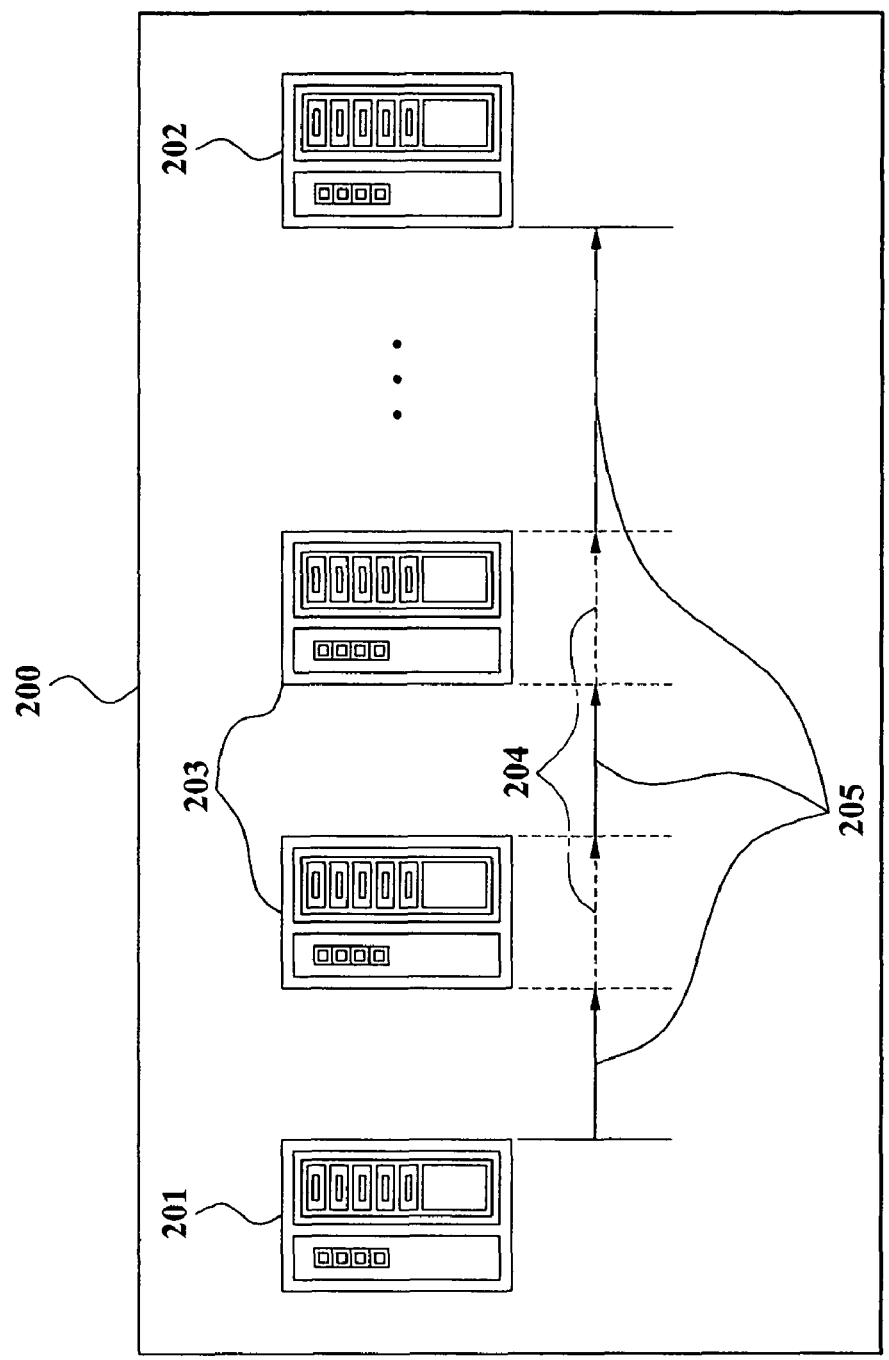
FIG. 2 is a diagram illustrating a method of determining a propagation delay and a distance between nodes in a packet network, according to exemplary embodiments of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention FIG. 2 is a diagram illustrating a method of determining a propagation delay and a distance between nodes in a packet network, according to exemplary embodiments of the present invention. When a ping packet sent from a source node 201 to a destination node 202 passes through one or more intermediate nodes 203, intermediate node delays 204 that are amounts of time of being delayed at the intermediate nodes 203 may occur.

According to exemplary embodiments of the present invention, propagation delays 205 between the source node 201 and the destination node 202 may be more precisely determined by removing the intermediate node delays 204 and a distance between the source node 201 and the destination node 202 may be determined by using the propagation delays 205.

The determined distance may be used for digital rights management (DRM) of contents to establish a valid distance for the contents and manage the contents to be sent or replayed within the valid distance.

Hereinafter, an exemplary method of determining the propagation delay and the distance by removing the intermediate node delays at the intermediate nodes will be described in detail referring to the drawings.

Figure 3:
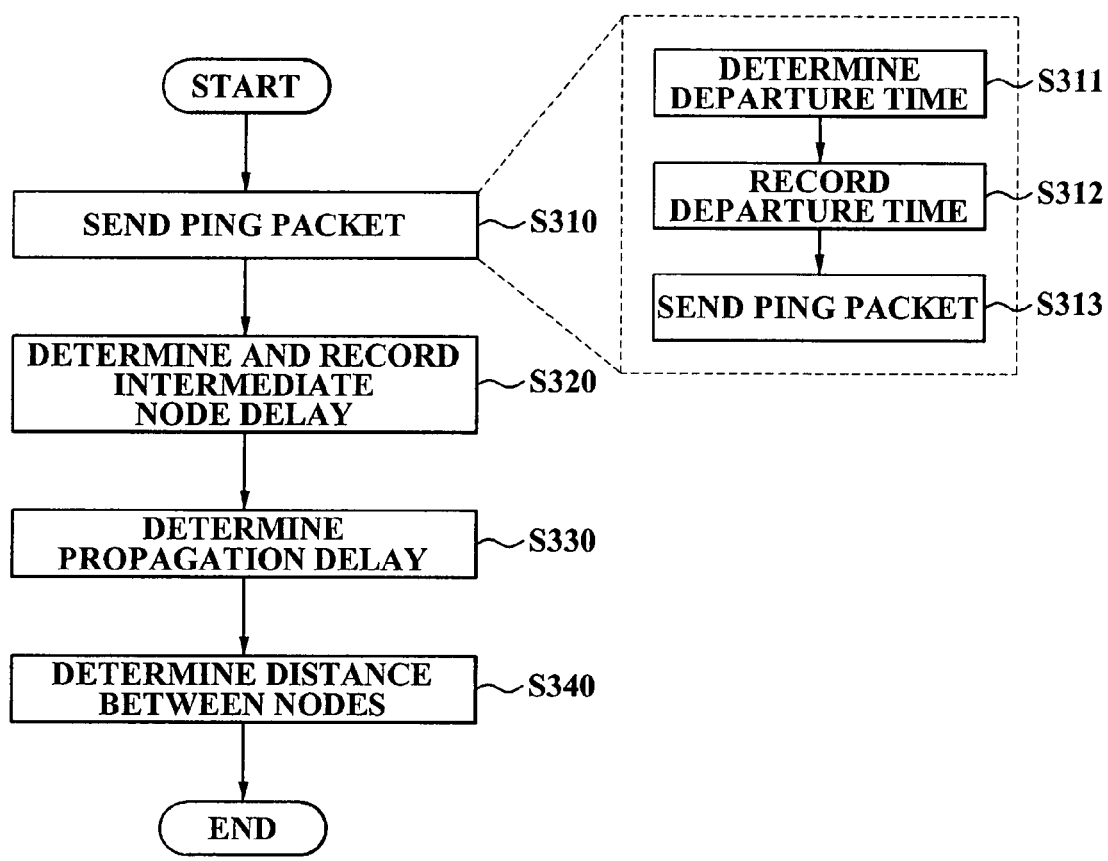
FIG. 3 is a flowchart illustrating a method of determining a propagation delay between nodes in a packet network according a first exemplary embodiment of the present invention.

FIG. 3 is a flowchart illustrating a method of determining a propagation delay between nodes in a packet network according a first exemplary embodiment of the present invention.

In operation S310, a source node sends a ping packet to a destination node. In this case, operation S310 may include sub-operations S311 through S313.

In sub-operation S311, the source node determines the departure time that the ping packet is sent. The departure time may be determined by using a timing signal provided by the packet network, which will be described below.

The ping packet includes a field, the departure time field, for recording the departure time. In sub-operation S312, the source node records the departure time in the departure time field of the ping packet. The departure time is used for determining the propagation delay. An internal configuration of the ping packet will be described in detail, referring to FIG. 5.

In sub-operation S313, the source node sends the ping packet to the destination node. The ping packet includes a source address of the source node and a destination address of the destination node. The ping packet may be sent to the destination node by using the source address and the destination address.

In operation S320, an intermediate node determines an intermediate node delay of the ping packet, and records the intermediate node delay in the ping packet. As described above, since the intermediate node delay may have a value much greater than the propagation delay between nodes, when the intermediate node delay is included in the propagation delay, a great error may occur in determining a distance between the nodes. In operation S320, the intermediate node delay may be determined and a process of enabling the intermediate node delay to be excluded from the propagation delay is performed.

The process will be described in detail, referring to FIG. 4.

In operation S330, the destination node determines the propagation delay by using the intermediate node delay. Namely, the destination node determines the propagation delay except for the intermediate node delay which may cause a problem with determining a distance between the source node and the destination node.

The process will be described in detail, referring to FIG. 8.

In operation S340, the destination node determines transmission speed of the ping packet and determines a distance between the nodes, based on the transmission speed and the propagation delay. In this case, the distance between the nodes may be determined by multiplying the propagation delay with the transmission speed.

As described above, the propagation delay between the source node and the destination node of the ping packet is precisely determined by removing the intermediate node delay with respect to the ping packet at the intermediate node, thereby determining the distance between the source node and the destination node and controlling a distance for establishing the connection between the nodes or propagation of contents and replay distance by a distance between the nodes.

Also, each node of the packet network appends a digital signature transferred to an adjacent node, to the ping packet or the follow-up packet to prevent unauthorized modification of the ping packet or the follow-up packet.

Figure 4:
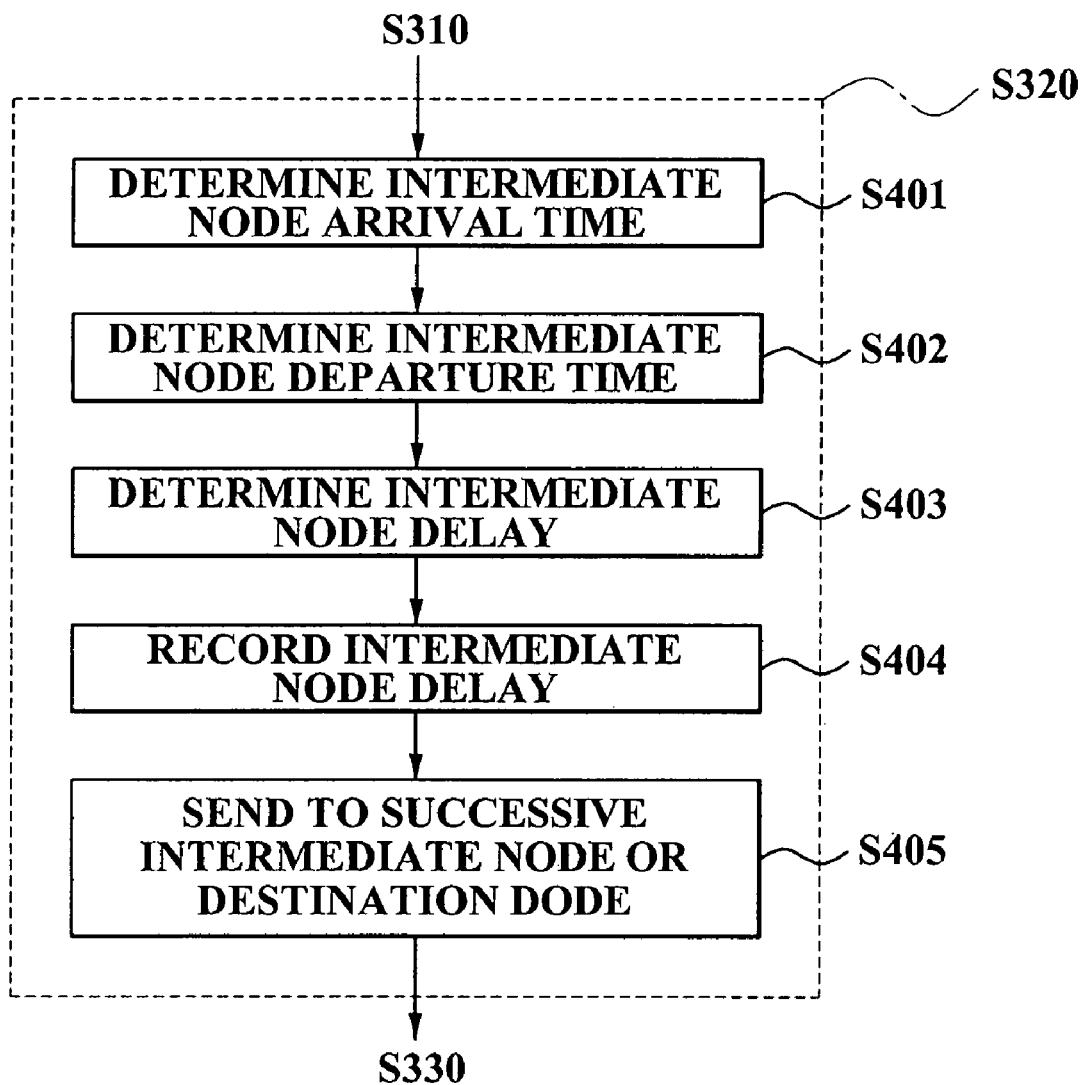
FIG. 4 is a flowchart illustrating a method of determining an intermediate node delay according to the first exemplary embodiment of the present invention.

FIG. 4 is a flowchart illustrating a method of determining an intermediate node delay according to the first exemplary embodiment of the present invention. Referring to FIG. 4, sub-operations S401 through S405 may be included in operation S320 illustrated in FIG. 3.

In sub-operation S401, an intermediate node determining an intermediate node delay receives the ping packet and determines an intermediate node arrival time. The intermediate node arrival time may be determined by using a timing signal at a point in time when the first byte of the ping packet is received.

In sub-operation S402, the intermediate node determines an intermediate node departure time at a point in time when the ping packet is sent. The intermediate node departure time may be determined by using a timing signal at the point in time when the first byte of the ping packet is sent.

In sub-operation S403, the intermediate node determines the intermediate node delay via a difference between the intermediate node departure time and the intermediate node arrival time. Namely, the intermediate node delay indicates a time used by the ping packet at the intermediate node. The propagation delay may be more precisely determined by removing the intermediate node delay from the propagation delay.

In sub-operation S404, the intermediate node records the intermediate node delay in an intermediate delay field included in the ping packet. The intermediate node delay may also be recorded in the departure time field instead of the intermediate node delay field using another sub-operation of the sub-operation S404. Each of the intermediate nodes determines an intermediate node delay with the departure time and records the intermediate node delay time in the intermediate delay field or departure time field of the ping packet. Accordingly, the destination node may determine the propagation delay more precisely by removing the intermediate node delay from the propagation delay.

In sub-operation S405, the intermediate node sends the ping packet to a successive intermediate node or the destination node. The intermediate node delay recorded in the intermediate node delay field or departure time field is accumulated in an accumulated delay field included in the ping packet by the successive intermediate node or the destination node. The intermediate node delay may be used in determining the propagation delay by the destination node.

Figure 5:
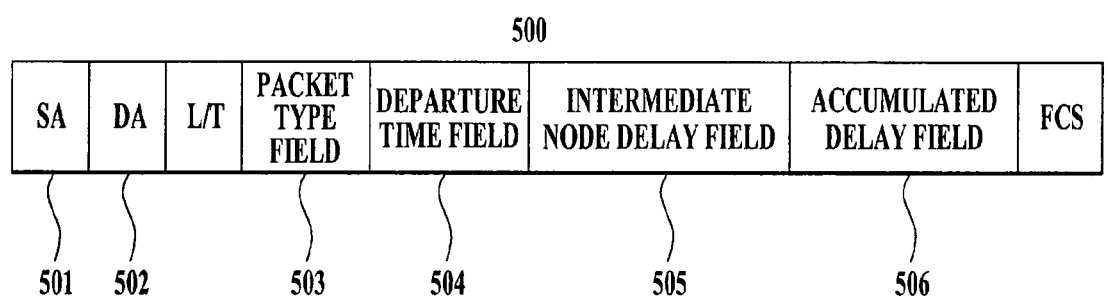
FIG. 5 illustrates an example of an internal configuration of a ping packet according to the first exemplary embodiment of the present invention.

FIG. 5 illustrates an example of an internal configuration of a ping packet 500 according to the first exemplary embodiment of the present invention. Referring to FIG. 5, the ping packet 500 may be sent from a source node to a destination node via a source address 501 and a destination address 502. A packet type field 503 may be a field indicating a type of a packet.

The source node may receive and record a timing signal from a packet network at a point in time that the ping packet 500 is sent. The timing signal may be recorded in a departure time field 504 as a departure time. The departure time may be used in determining the propagation delay by the destination node.

The intermediate node delay field 505 is a field recording the intermediate node delay computed by using the timing signal at a point in time when the first byte of the ping packet is received and sent. The intermediate node delay may be accumulated in an accumulated delay field 506 by the successive intermediate node or the destination node.

The intermediate node delay may be used in determining the propagation delay except for the intermediate node delay by the destination node and the propagation delay may be used in determining a distance between the source node and the destination node more precisely.

Figure 6:
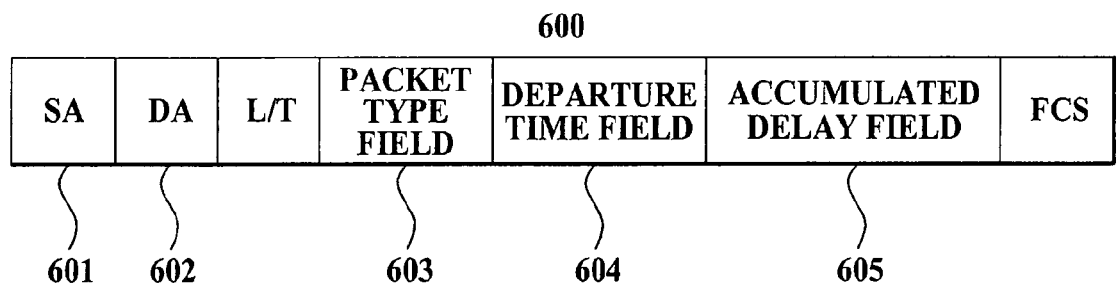
FIG. 6 illustrates other example of an internal configuration of a ping packet according to the first exemplary embodiment of the present invention.

FIG. 6 illustrates another example of an internal configuration of a ping packet according to the first exemplary embodiment of the present invention.

Referring to FIG. 6, the ping packet 600 may be sent from a source node to a destination node via a source address 601 and a destination address 602. A packet type field 603 may be a field indicating a type of a packet. In this case, the source node may receive and record a timing signal from a packet network at a point in time that the ping packet 600 is sent. The timing signal may be recorded in a departure time field 604 as a departure time.

Also, in the departure time field 604 is recorded the intermediate node delay computed by using the timing signal at a point in time when the first byte of the ping packet is received and sent. The intermediate node delay may be accumulated in an accumulated delay field 605 by a successive intermediate node or the destination node. Namely, the destination node may determine a distance between the source node and the destination node using the propagation delay except for the intermediate node delay accumulated with the departure time.

Figure 7:
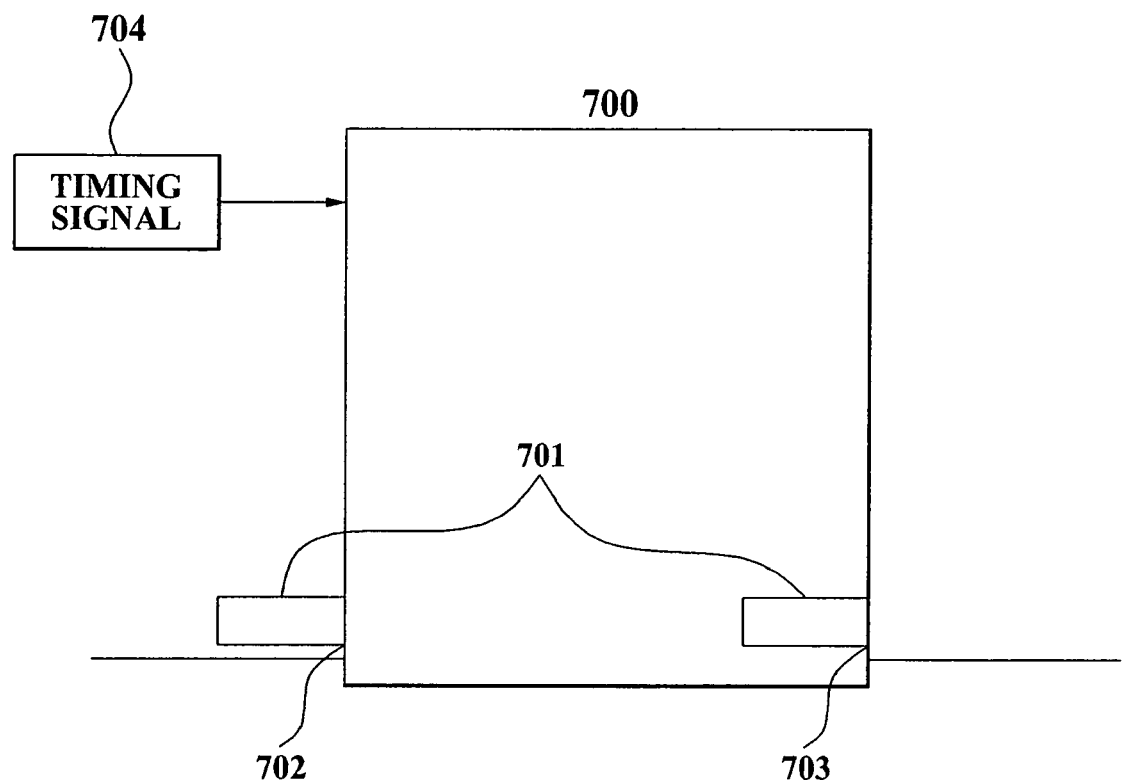
FIG. 7 is a diagram illustrating an example of a method of determining an intermediate node delay according to the first exemplary embodiment of the present invention.

FIG. 7 is a diagram illustrating an example of a method of determining an intermediate node delay according to the first exemplary embodiment of the present invention. Referring to FIG. 7, an intermediate node 700 determines an intermediate node arrival time 702 that is a point in time when a first byte of a ping packet 701 is received. The intermediate node also determines an intermediate node departure time 703 that is a point in time when the first byte of the ping packet 701 is sent.

The above intermediate node arrival time 702 and the intermediate node departure time 703 may be determined by using a timing signal 704 provided by a packet network for synchronization.

The intermediate node 700 may compute an intermediate node delay that is a time used by the ping packet at the intermediate node 700, by using a difference between the intermediate node departure time 703 and the intermediate node arrival time 702. The intermediate node delay may be recorded in the intermediate node delay field 505 or the departure time field 604.

The intermediate node delay may be accumulated in the accumulated delay field, 506 or 605, by a successive intermediate node or the destination node in an exemplary method of sending the intermediate node delay recorded in the intermediate node delay field.

Also, the intermediate node delay may be accumulated in the departure time field by the intermediate node in method of accumulating the intermediate node delay with the departure time.

Figure 8:
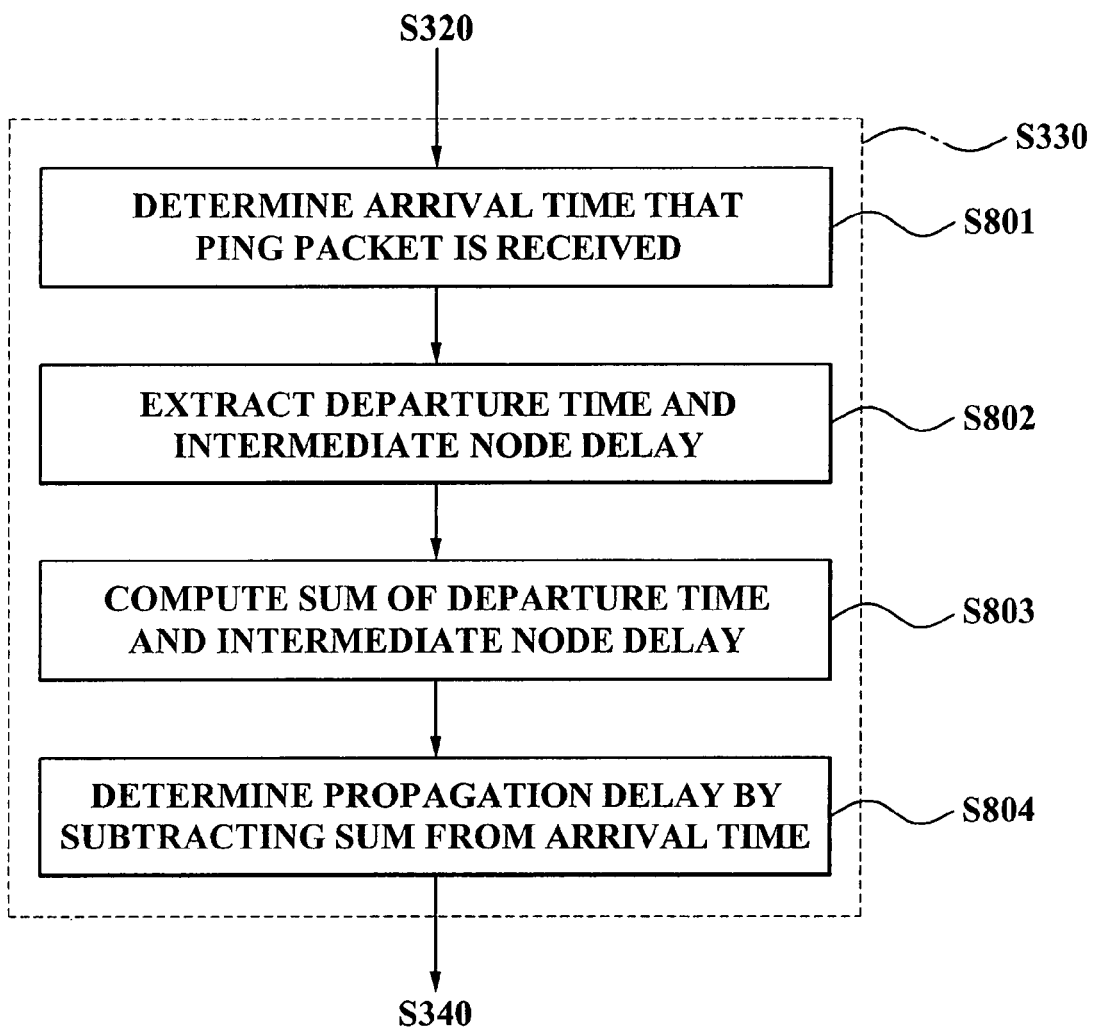
FIG. 8 is a flowchart illustrating a method of determining a propagation delay in destination node according a first exemplary embodiment of the present invention.

FIG. 8 is a flowchart illustrating a method of determining a propagation delay in destination node according a first exemplary embodiment of the present invention. Referring to FIG. 8, sub-operations S801 through S804 may be included in operation S330 illustrated in FIG. 3.

In sub-operation S801, the destination node determines the arrival time that the ping packet is received. The packet network may provide a timing signal for synchronization between nodes. Each node may determine the departure time and the arrival time required for determining the propagation delay of the ping packet via the timing signal at a point in time that a first byte of the ping packet or the follow-up packet is sent.

In sub-operation S802, the destination node extracts the departure time and the intermediate node delay from the ping packet. Namely, the destination node extracts the departure time from the departure time field of the ping packet and the intermediate node delay from the accumulated delay field of the ping packet.

Because, the intermediate node delay is accumulated by a successive intermediate node or the destination node, the destination node extracts the total accumulated intermediate node delay accumulated in all intermediate nodes.

In sub-operation S803, the destination node computes the sum of the departure time and the intermediate node delay.

In sub-operation S804, the destination node determines the propagation delay by subtracting the computed sum from the arrival time. The destination node determines the propagation delay more precisely through subtracting the computed sum from the arrival time.

Because the intermediate node delay is already accumulated with the departure time in an exemplary method using ping packet 600 illustrated in FIG. 6, the destination node may determine the propagation delay by subtracting the departure time from the arrival time.

The destination node may manage the contents and the connection between the source node and the destination node by using the propagation delay.

Figure 9:
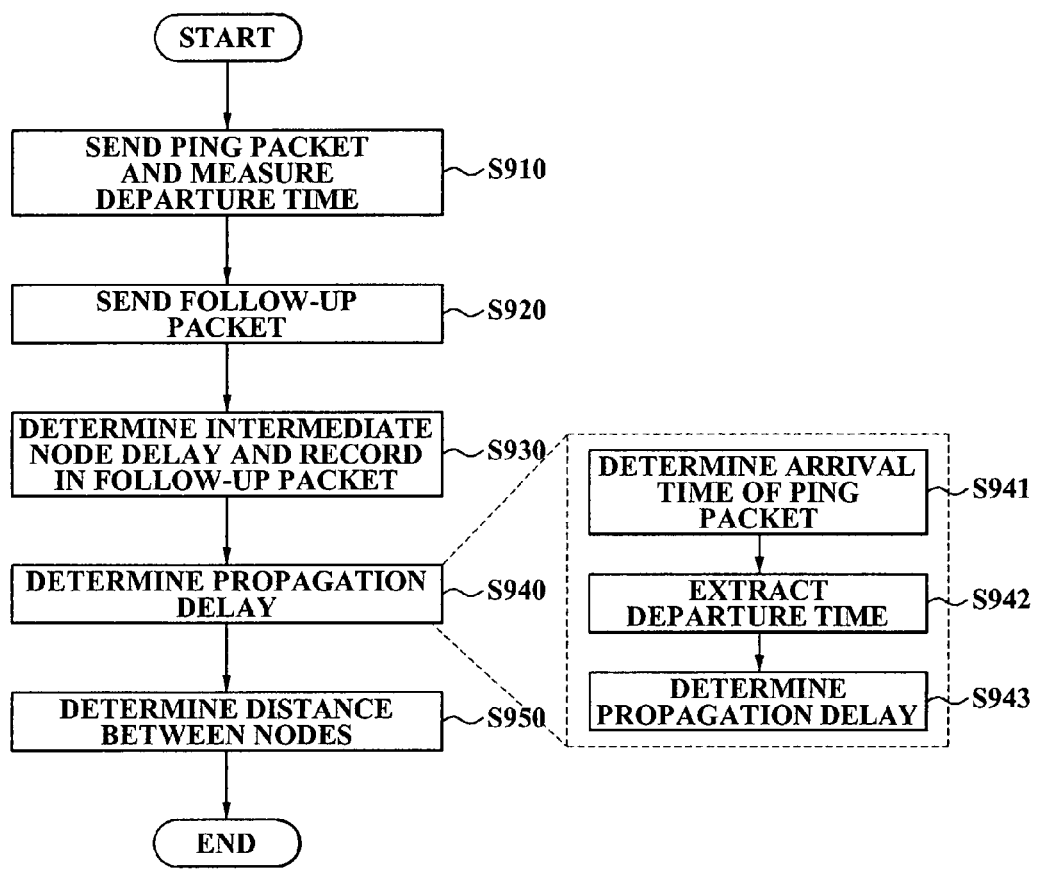
FIG. 9 is a flowchart illustrating a method of determining a propagation delay between nodes in a packet network, according to a second embodiment of the present invention.

FIG. 9 is a flowchart illustrating a method of determining a propagation delay between nodes in a packet network, according to a second exemplary embodiment of the present invention.

In operation S910, a source node sends a ping packet to a destination node and determines and stores a departure time. In this case, the departure time may be determined by using a timing signal provided by the packet network for synchronization at a point in time when a first byte of the ping packet is sent.

In operation S920, the source node records the departure time in a follow-up packet and sends the follow-up packet to the destination node. The follow-up packet follows a path of the ping packet. Information with respect to the ping packet is recorded in the follow-up packet. The information recorded in the follow-up packet may be used for determining a propagation delay at the destination node.

In operation S930, an intermediate node determines and records an intermediate node delay of the ping packet in the follow-up packet. The intermediate node delay is a cause of generating an error in the propagation delay. The intermediate node delay of the ping packet may be recorded in the follow-up packet and may be used for more precisely determining the propagation delay at the destination node.

A method of determining and recording the intermediate node delay in the follow-up packet will be described in detail referring to FIG. 10.

In operation S940, the destination node determines the propagation delay, based on the ping packet and the follow-up packet. In this case, operation S940 may include sub-operations S941 through S943.

In sub-operation S941, the destination node determines an arrival time of the ping packet. In this case, the arrival time may be also determined by using the timing signal.

In sub-operation S942, the destination node extracts the departure time from the follow-up packet. The intermediate node delay may be accumulated in a departure time field by the intermediate node.

Also, the intermediate node delay may be accumulated in an accumulated delay field by the intermediate node. In this case, the destination node extracts the departure time and the intermediate node delay.

In sub-operation S943, the destination node determines the propagation delay by subtracting the departure time from the arrival time. In another method for determining the propagation delay, the destination node may compute the sum of the departure time and the intermediate node delay and may determine the propagation delay by subtracting the sum from the arrival time.

Since the intermediate node delays are accumulated in either the departure time field or the accumulated delay field, the propagation delay, that is the difference between the arrival time and the departure time, does not include the intermediate node delay, thereby more precisely determining whether the destination node is permissible, by the propagation delay.

Whether the more precisely determined propagation delay exceeds a limiting time period for the delay threshold between the source node and the destination node is determined, thereby determining whether connection between the source node and the destination node or transmission of contents is permissible.

In operation S950, the destination node determines transmission speed of the ping packet and determines a distance between the nodes, based on the transmission speed and the propagation delay.

The distance between the nodes may be determined by multiplying the propagation delay with the propagation speed.

As described above, the propagation delay between the source node and the destination node of the ping packet is precisely determined by removing the intermediate node delay with respect to the ping packet at the intermediate node, thereby determining a distance between the source node and the destination node and controlling a distance for establishing the connection between the nodes or propagation of contents and replay distance via the distance between the nodes.

Also, each node of the packet network appends a digital signature, to be transferred to an adjacent node, to the ping packet or the follow-up packet to prevent unauthorized modification of the ping packet or the follow-up packet.

Figure 10:
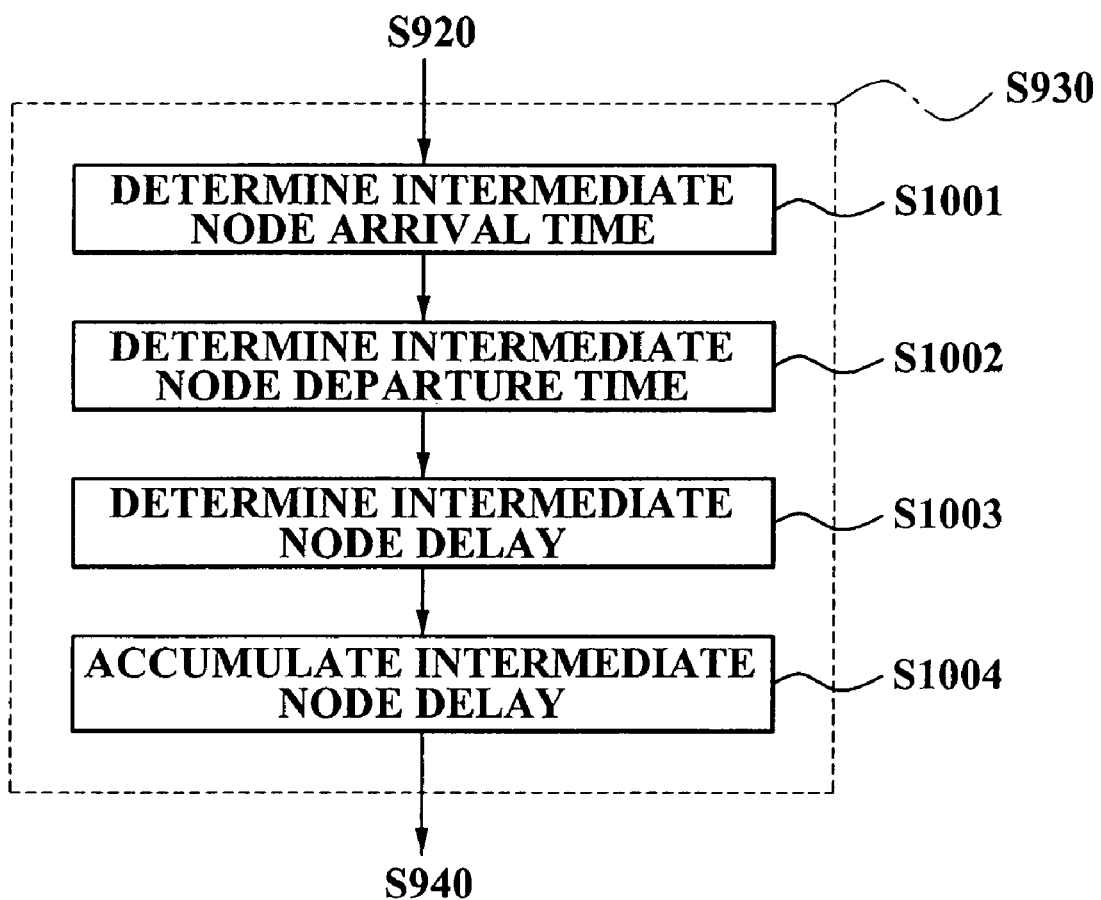
FIG. 10 is a flowchart illustrating a method of determining an intermediate node delay according to the second exemplary embodiment of the present invention.

FIG. 10 is a flowchart illustrating a method of determining an intermediate node delay according to the second exemplary embodiment of the present invention. Referring to FIG. 10, sub-operations S1001 through S1004 may be included in operation S930 illustrated in FIG. 9.

In sub-operation S1001, an intermediate node determining and recording an intermediate node delay of a ping packet in a follow-up packet determines an intermediate node arrival time that is a point in time of receiving the ping packet.

In sub-operation S1002, the intermediate node determines an intermediate node departure time that is a point in time of sending the ping packet. In this case, the intermediate node arrival time and the intermediate node departure time may be determined by using a timing signal received at a point in time of receiving or sending a first byte of the ping packet. The timing signal is provided for synchronization of each node, by the packet network.

In sub-operation S1003, the intermediate node determines the intermediate node delay by using a difference between the intermediate node departure time and the intermediate node arrival time.

In sub-operation S1004, the intermediate node accumulates the intermediate node delay in either the departure time field or the accumulated delay field.

As described above, by accumulating the intermediate node delay in either the departure time field or the accumulated delay field of the follow-up packet, when the propagation delay is determined at the destination node of the ping packet, the intermediate node delay may be excluded from the propagation delay, thereby more precisely determining the propagation.

A delay in recording the departure time in the ping packet may also be removed by using the follow-up packet.

Figure 11:
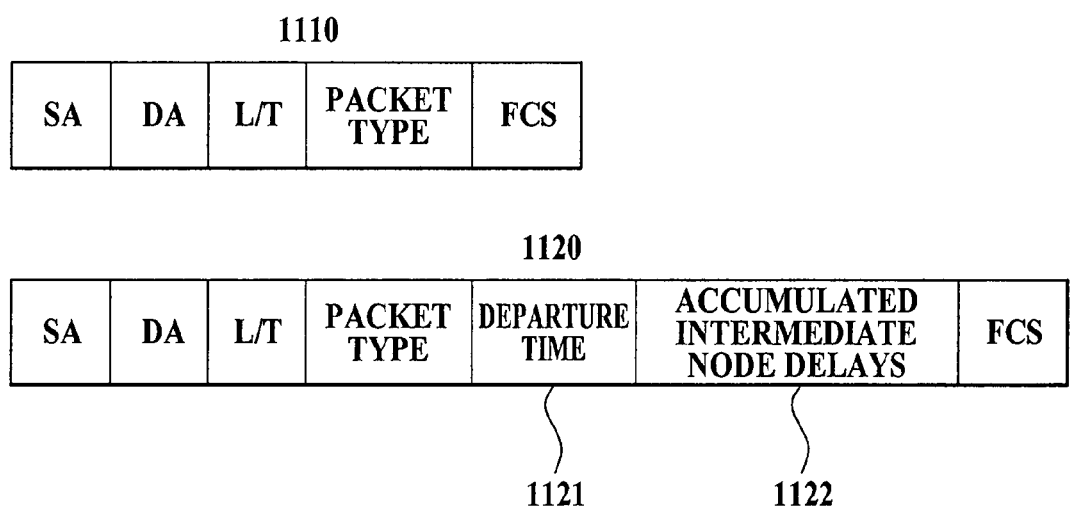
FIG. 11 illustrates an example of internal configurations of a ping packet and a follow-up packet according to the second exemplary embodiment of the present invention.

FIG. 11 illustrates an example of internal configurations of a ping packet 1110 and a follow-up packet 1120 according to the second exemplary embodiment of the present invention. The ping packet 1110 performs a function of recognizing a path between a source node and a destination node of the ping packet 1110. Specifically, the path in which the ping packet 1110 is sent from the source node to the destination node is recognized. The information of the departure time field 504 and the intermediate node delay field 505, that are recorded in the ping packet 500 of the first embodiment, are recorded in the follow-up packet 1120 following the path.

The follow-up packet 1120 may be used for removing a delay in recording the information in the ping packet 1110 and may include a departure time field 1121 for recording a departure time at the source node and an accumulated field 1122 in which the intermediate node delay is accumulated by an intermediate node.

The departure time and the intermediate node delay recorded in the departure time field 1121 or the accumulated delay field 1122 may be used for more precisely determining a propagation delay at the destination node.

Figure 12:
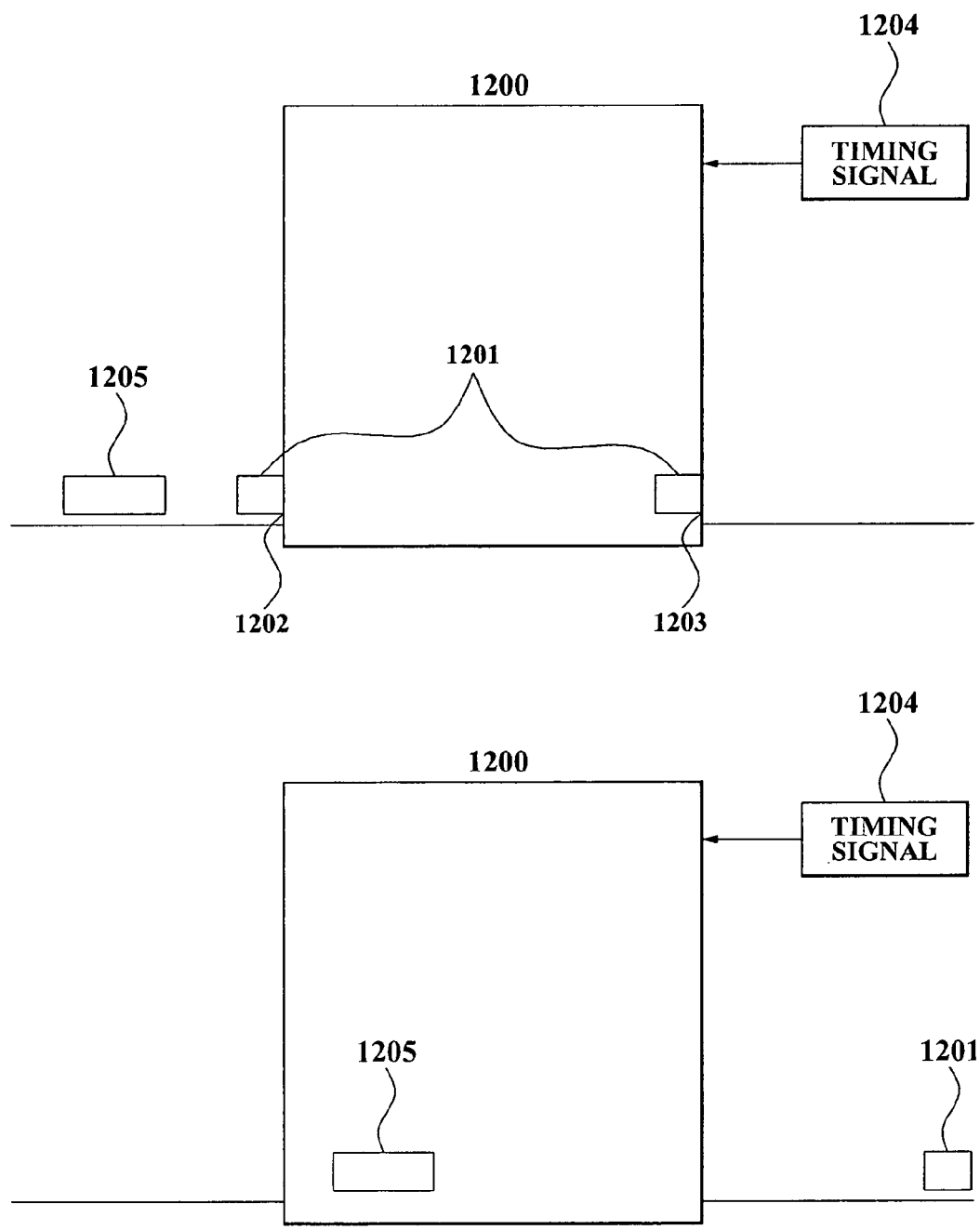
FIG. 12 is a diagram illustrating an example of the method of determining the intermediate node delay according to the second exemplary embodiment of the present invention.

FIG. 12 includes diagrams illustrating an example of a method of determining an intermediate node delay according to the second exemplary embodiment of the present invention.

Referring to FIG. 12, an intermediate node 1200 determines and stores an intermediate node arrival time 1202 that is a point in time when receiving a first byte of a ping packet 1201 and an intermediate node departure time 1203 that is a point in time when sending the first byte of the ping packet 1201.

In this case, the intermediate node 1200 computes an intermediate node delay of the ping packet 1201 by using a difference between the intermediate node departure time 1203 and the intermediate node arrival time 1202. In the second exemplary embodiment, different from the first exemplary embodiment, the computed intermediate node delay is not recorded in the ping packet 1201 but is recorded in a follow-up packet 1205 following the ping packet 1201.

In this case, recording the intermediate node delay in the follow-up packet 1205 allows for delay in recording the intermediate node delay in the ping packet 1201.

Also, the intermediate node departure time 1203 and the intermediate node arrival time 1202 may be determined by using a timing signal 1204 provided for synchronization, by a packet network.

Figure 13:
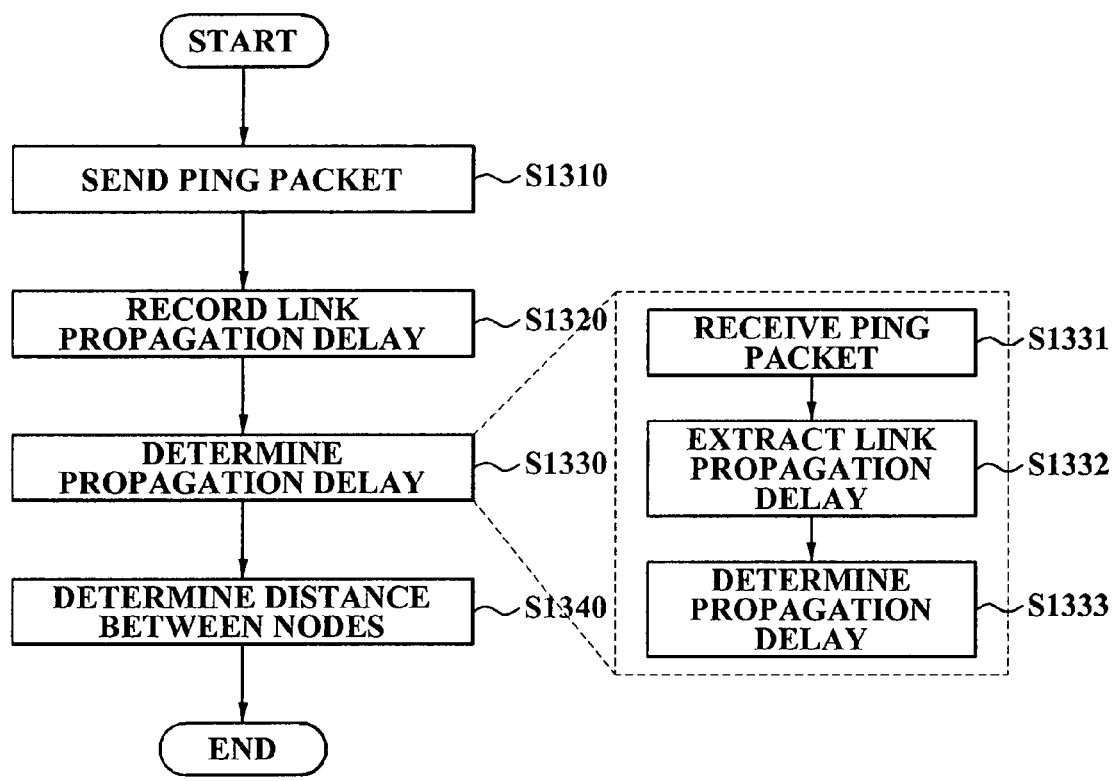
FIG. 13 is a flowchart illustrating a method of determining a propagation delay between nodes in a packet network, according to a third exemplary embodiment of the present invention.

FIG. 13 is a flowchart illustrating a method of determining a propagation delay between nodes in a packet network, according to a third exemplary embodiment of the present invention. This embodiment may be used when the link propagation delays are determined and stored separately, for example, by the network synchronization scheme.

Referring to FIG. 13, in operation S1310, a source node sends a ping packet to a destination node.

In operation S1320, an intermediate node, through which the ping packet passes while being sent to the destination node, records the link propagation delay for the link on which the ping packet arrived, in the ping packet. Since each node in the packet network computes and stores the link propagation delay with respect to a link with an adjacent node, when the ping packet is received, the link propagation delay is acquired and recorded in the ping packet, by recognizing the link on which the ping packet arrived.

Also, when the ping packet passes through a plurality of intermediate nodes, the link propagation delay may be continuously accumulated and recorded in the ping packet by the intermediate node.

In operation S1330, the destination node determines a propagation delay, based on the accumulated link propagation delay. In this case, as illustrated in FIG. 13, operation S1330 may include sub-operations S1331 through S1333.

In sub-operation S1331, the destination node receives the ping packet. In this case, the destination node checks a destination address field of the ping packet and recognizes a destination of the ping packet as the destination node when the destination address of the ping packet is identical with an address of the destination node.

In sub-operation S1332, the destination node extracts the link propagation delays accumulated in the ping packet. The link propagation delay is a propagation delay with respect to the link with the adjacent node and does not include an intermediate node delay of the ping packet. The link propagation delay indicates a time accumulated with respect to the links through which the ping packet passes.

In sub-operation S1333, the destination node determines the link propagation delay as the propagation delay. Namely, as described in operation S1332, since the link propagation delay at the destination node is an accumulation of delays with respect to each link of the ping packet, the link propagation delay may be used as the propagation delay.

In operation S1340, the destination node determines a propagation delay of the ping packet and determines a distance between the nodes, based on the propagation speed and the propagation delay. A decision of whether to connect the source node with the destination node may be determined and whether the destination node exists in a certain area may be precisely determined by using the propagation delay and the distance between the nodes.

As described above, with respect to the packet network in which each node stores the link propagation delay with respect to a link between adjacent nodes, the link propagation delay is accumulated in the ping packet and the propagation delay is determined by using the link propagation delay, thereby determining a distance between the source node and the destination node.

Figure 14:
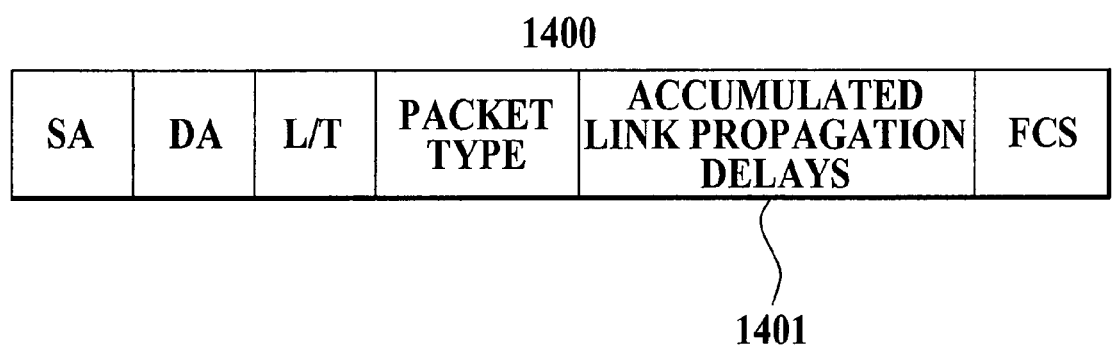
FIG. 14 illustrates an example of an internal configuration of a ping packet according to the third exemplary embodiment of the present invention.

FIG. 14 illustrates an example of an internal configuration of a ping packet 1400 according to the third exemplary embodiment of the present invention. Referring to FIG. 14, the ping packet 1400 accumulates a link propagation delay stored in an intermediate node in a link propagation delay field 1401 whenever passing through an intermediate node. As described referring to FIG. 13, since each node stores the link propagation delay with respect to the link with the adjacent node, the link propagation delay is accumulated in the link propagation delay field 1401, a propagation delay of the ping packet 1400 is determined at a destination node of the ping packet by using only the accumulated link propagation delay, and a delay at the intermediate node is not included in the propagation delay.

Figure 15:
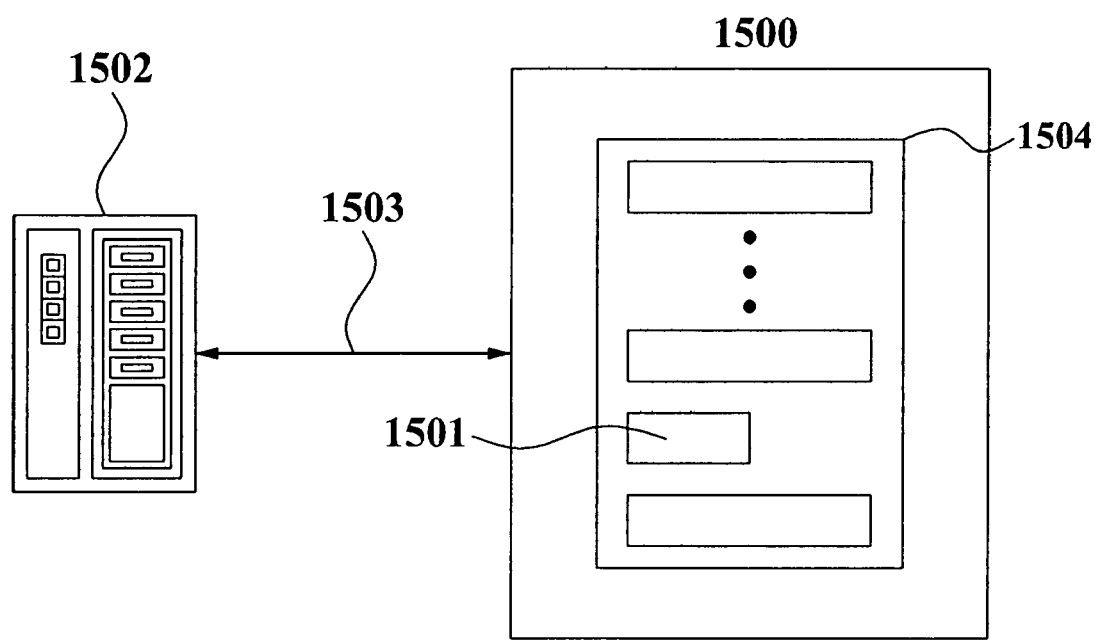
FIG. 15 is a diagram illustrating an example of a method of recording a link propagation delay in the ping packet at an intermediate node, according to the third exemplary embodiment of the present invention.

FIG. 15 is a diagram illustrating an example of a method of recording a link propagation delay in the ping packet at an intermediate node 1500, according to the third exemplary embodiment of the present invention. Referring to FIG. 15, the intermediate node 1500 has previously determined a link propagation delay 1503 with an adjacent node 1502 from which a ping packet 1501 is sent. When receiving the ping packet 1501, the intermediate node 1500 accumulates the link propagation delay 1503 in a link propagation delay field of the ping packet 1501 and stores the ping packet 1501 in a buffer 1504 to be subsequently sent. However, as described referring to FIGS. 13 and 14, a delay of being stored in the buffer 1504 and waiting for a turn at the intermediate node 1500 is not considered for determining a propagation delay of the ping packet 1501 at a destination node of the ping packet 1501.

Namely, the propagation delay, from which the delay at the intermediate node 1500 is removed, may be determined.

Figure 16:
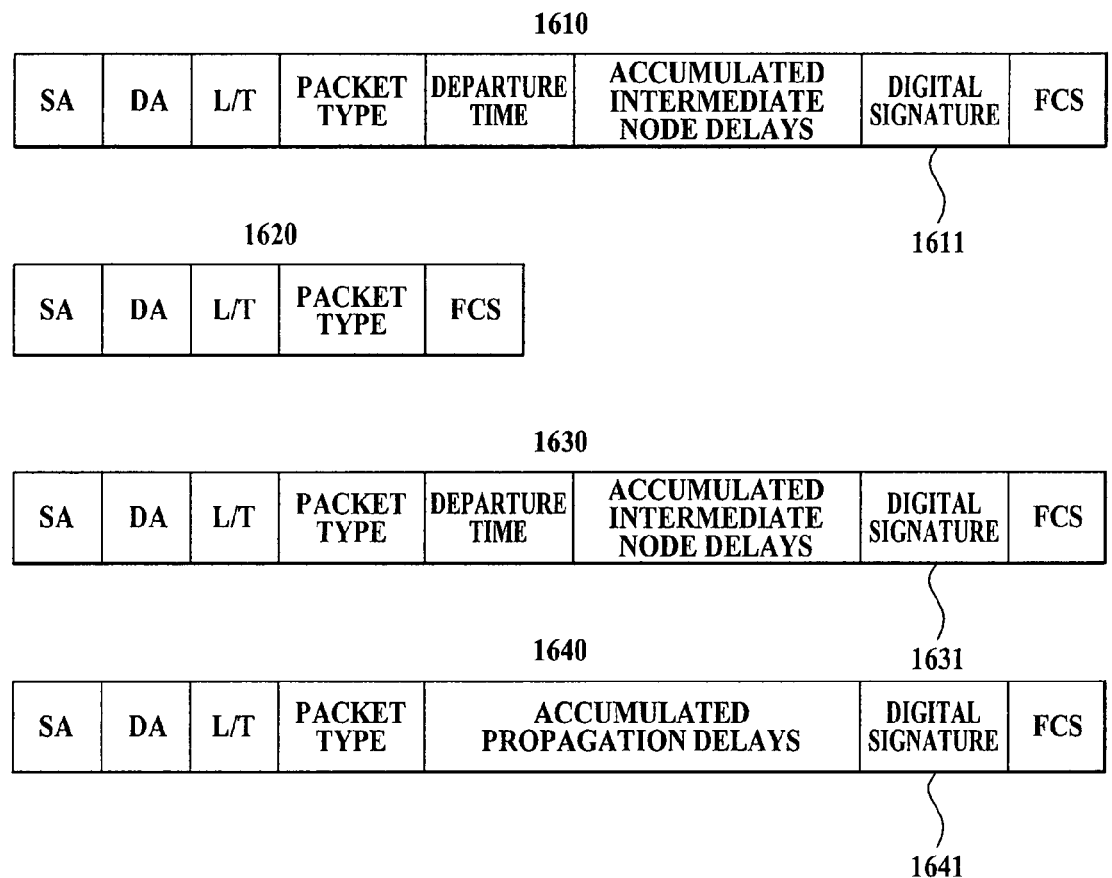
FIG. 16 illustrates examples of appending a digital signature to a ping packet or a follow-up packet, according to the first through third exemplary embodiments of the present invention.

FIG. 16 illustrates examples of appending a digital signature to a ping packet or a follow-up packet, according to the first through third exemplary embodiments of the present invention. In FIG. 16, a method of using the digital signature to increase security in the first through third exemplary embodiments is described.

In the first and third exemplary embodiments, digital signatures 1611 and 1641 may be appended to ping packets 1610 and 1640, respectively. Also, in the second exemplary embodiment, a digital signature 1631 may be appended to a follow-up packet 1630 instead of a ping packet 1620.

The digital signatures 1611, 1631, and 1641 may be used for preventing unauthorized modification with respect to the ping packets 1610, 1620, and 1640, and the follow-up packet 1630 and may be computed by using a public key cryptography method.

Figure 17:
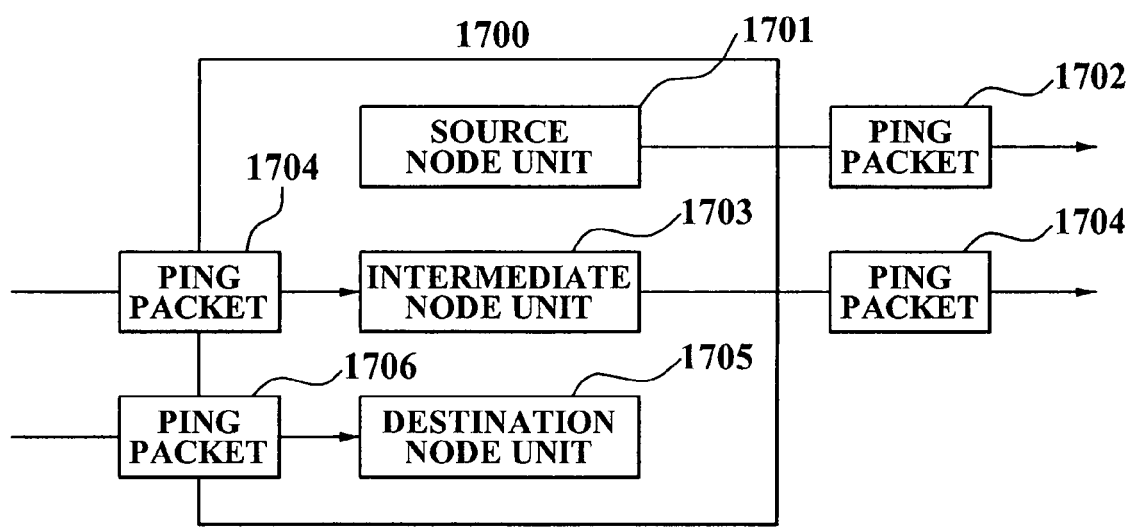
FIG. 17 is a block diagram illustrating an internal configuration of a propagation delay determining node in a packet network, according to a fourth exemplary embodiment of the present invention.

FIG. 17 is a block diagram illustrating an internal configuration of a node 1700 determining a propagation delay in a packet network, according to a fourth exemplary embodiment of the present invention. Referring to FIG. 17, each node 1700 included in the packet network may include a source node unit 1701, an intermediate node unit 1703, and a destination node unit 1705.

The source node unit 1701 sends the ping packet 1702 for determining a propagation delay, to a destination node. In this case, the source node unit 1701 may include a departure time determiner (not shown) for determining a departure time at a point in time when sending the ping packet 1702, a departure time recorder (not shown) for recording the departure time in the ping packet 1702, and a ping packet sender (not shown) for sending the ping packet 1702 to the destination node.

The intermediate node unit 1703 records an intermediate node delay of a ping packet 1704 in the ping packet 1704 when the ping packet 1704 whose destination is not the same node 1700 is received. In this case, the intermediate node unit 1703 may include an intermediate node arrival time determiner (not shown) for determining an intermediate node arrival time that is a point in time when receiving the ping packet 1704, an intermediate node departure time determiner (not shown) for determining an intermediate node departure time that is a point in time of sending the ping packet 1704, an intermediate node delay determiner (not shown) for determining the intermediate node delay by using a difference between the intermediate node departure time and the intermediate node arrival time, and an intermediate node delay accumulator (not shown) for accumulating the intermediate node delay with the departure time included in the ping packet 1704.

Also, the intermediate node unit 1703 may include an intermediate node delay recorder (not shown) for recording the intermediate node delay in an intermediate node delay field included in the ping packet 1704 instead of the intermediate node delay accumulator. The intermediate node delay may be accumulated in the accumulated delay field by a successive intermediate node or the destination node.

The destination node unit 1705 receives a ping packet 1706 whose destination is the node 1700 and determines the propagation delay by using an intermediate node delay included in a ping packet 1706. The destination node unit 1705 may include an arrival time determiner (not shown) for determining an arrival time that is a point in time of receiving the ping packet 1706 at the node 1700, a departure time extractor (not shown) for extracting the departure time from the ping packet 1706, and a propagation delay determiner (not shown) for determining the propagation delay by subtracting the departure time from the arrival time field.

Also, destination node unit 1705 may include an extractor (not shown) for extracting the departure time and the intermediate node delay in the ping packet 1704 and a sum computer (not shown) for computing the sum of the departure time and the intermediate node delay instead of the departure time extractor. The propagation delay determiner may determine the propagation delay by subtracting the sum from the arrival time.

As described above, a propagation delay between a source node and a destination of a ping packet is precisely determined by removing an intermediate node delay with respect to the ping packet at an intermediate node, thereby determining a distance between the source node and the destination node.

The exemplary embodiments according to the present invention may be executed by a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

According to exemplary embodiments of the present invention, a distance between a source node and a destination node of a ping packet may be determined by precisely determining a propagation delay between the source node and the destination node by removing an intermediate node delay with respect to the ping packet at an intermediate node.

According to exemplary embodiments of the present invention, a link propagation delay of a link between adjacent nodes may be accumulated and stored in a ping packet, a propagation delay may be determined by using the accumulated link propagation delays, and a distance between a source node and a destination node may be determined.

According to exemplary embodiments of the present invention, a digital signature sent to an adjacent node to prevent an unauthorized modification with respect to a ping packet may be appended to the ping packet or, instead of the ping packet, a follow-up packet in which a departure time and an intermediate node delay of the ping packet are recorded.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of measuring a propagation delay between nodes in a packet network, the method comprising:
    transmitting a ping packet from a first node to a second node through one or more intermediate nodes and recording a departure time of the ping packet in a departure time field of the ping packet, the departure time comprising a time at which the ping packet is transmitted;
    determining an intermediate node delay of the ping packet at the one or more intermediate nodes through which the ping packet is transmitted;
    recording, at the one or more intermediate nodes, the intermediate node delay of each intermediate node in the departure time field to generate an accumulated departure time and intermediate node delay; and
    determining a propagation delay by determining an arrival time at which the ping packet arrives at the second node, extracting the accumulated departure time and intermediate node delay recorded in the departure time field of the ping packet, and subtracting the extracted accumulated departure time and intermediate node delay from the arrival time,
    wherein an amount of time for each intermediate node delay and the departure time are accumulated into a single amount of time, the single amount of time is recorded in the departure time field as the accumulated departure time and intermediate node delay, and the propagation delay is determined by subtracting only the single amount of time from the arrival time.

2. The method of claim 1, further comprising:
    determining a transmission speed of the ping packet;

determining, a distance between the first node and at least one of the second node and the one or more intermediate nodes, based on the transmission speed and the propagation delay;

establishing a valid distance of digital rights management of content based on the determined distance; and configuring the content for sending or replaying within the valid distance, wherein the determining of the propagation delay comprises determining of the propagation delay at the second node.

3. The method of claim 2, further comprising accumulating the intermediate node delay by a successive intermediate node of the one or more intermediate nodes at which the intermediate node delay is determined or the second node.

4. The method of claim 1, wherein the determining of the intermediate node delay of the ping packet at the one or more intermediate nodes comprises:

receiving the ping packet and determining an intermediate node arrival time;

determining an intermediate node departure time of the ping packet; and determining the intermediate node delay by determining a difference between the intermediate node departure time and the intermediate node arrival time.

5. The method of claim 1, wherein the determining of the intermediate node delay of the ping packet at the one or more intermediate nodes comprises:

receiving the ping packet at an intermediate node and determining an intermediate node arrival time;

determining an intermediate node departure time of the ping packet;

determining the intermediate node delay using a difference between the intermediate node departure time and the intermediate node arrival time; and accumulating the intermediate node delay in the departure time field included in the ping packet.

6. The method of claim 5, wherein the determining an intermediate node delay of the ping packet at the one or more intermediate nodes further comprises:

transmitting the ping packet from a first intermediate node to a second intermediate node or to the second node, wherein, when the ping packet passes through two intermediate nodes, the intermediate node delay is computed and accumulated in the departure time field of the ping packet by each of the two intermediate nodes.

7. The method of claim 1, wherein:

the packet network provides a timing signal for synchronization between nodes; and the one or more intermediate nodes and the second node determine a time using the timing signal at an instant of time that a first byte of the ping packet or a follow-up packet arrives.

8. The method of claim 1, wherein each of the first, the second and the one or more intermediate nodes through which the ping is transmitted in the packet network appends a digital signature to the ping packet or a follow-up packet to be sent to an adjacent node to protect against unauthorized modification of the ping packet or the follow-up packet.

9. A non-transitory computer-readable recording medium comprising instructions for causing a computer to execute a method of determining a propagation delay between nodes in a packet network, the instructions comprising:

a first set of instructions for transmitting a ping packet from a first node to a second node through one or more intermediate nodes and recording a departure time of the ping packet in a departure time field of the ping packet, the departure time comprising a time at which the ping packet is transmitted;

a second set of instructions for determining an intermediate node delay of the ping packet at one or more intermediate nodes through which the ping packet is transmitted;

a third set of instructions for recording, at the one or more intermediate nodes, the intermediate node delay of each intermediate node in the departure field to generate an accumulated departure time and intermediate node delay; and a fourth set of instructions for determining a propagation delay by determining an arrival time at which the ping packet arrives at the second node, extracting the accumulated departure time and intermediate node delay recorded in the departure time field of the ping packet, and subtracting the extracted accumulated departure time and intermediate node delay from the arrival time, wherein an amount of time for each intermediate node delay and the departure time are accumulated into a single amount of time, the single amount of time is recorded in the departure time field as the accumulated departure time and intermediate node delay, and the propagation delay is determined by subtracting only the single amount of time from the arrival time.

10. A method of determining a propagation delay between nodes in a packet network, the method comprising:

transmitting a ping packet from a first node to a second node and storing a departure time;

recording the departure time in a departure time field of a follow-up packet and sending the follow-up packet to the second node, the departure time comprising a time at which the ping packet is transmitted;

determining an intermediate node delay of the ping packet at a plurality of intermediate nodes;

recording, at each intermediate node, the intermediate node delay of each intermediate node in the departure time field of the follow-up packet to generate an accumulated departure time and intermediate node delay; and determining a propagation delay at the second node, based on the ping packet and the follow-up packet, by determining an arrival time at which the ping packet arrives at the second node, extracting the accumulated departure time and intermediate node delay from the follow-up packet, and subtracting the extracted accumulated departure time and intermediate node delay from the arrival time, wherein an amount of time for each intermediate node delay and the departure time are accumulated into a single amount of time, the single amount of time is recorded in the departure time field as the accumulated departure time and intermediate node delay, and the propagation delay is determined by subtracting only the single amount of time from the arrival time.

11. The method of claim 10, wherein the determining an intermediate node delay of the ping packet at a third node and recording the intermediate node delay in the follow-up packet comprises:

determining a third node arrival time that the ping packet arrives at the third node;

determining a third node departure time that the ping packet departs from the third node;

determining the intermediate node delay by using a difference between the third node departure time and the third node arrival time; and sending the follow-up packet recording the intermediate node delay accumulated in the departure time field of the follow-up packet.

12. The method of claim 10, further comprising:
   determining a transmission speed of the ping packet;
   determining, by the second node, a distance between the first node and at least one of the second node and the third node, based on the transmission speed and the propagation delay;
   establishing a valid distance of digital rights management of content based on the determined distance; and
   configuring the content for sending or replaying within the valid distance.

13. A method of determining a propagation delay between nodes in a packet network, the method comprising:
   transmitting a ping packet from a source node to a destination node and storing a departure time of the ping packet in a departure time field of the ping packet, the departure time comprising a time at which the ping packet is transmitted;
   recording, at one or more intermediate nodes, a link propagation delay of a link in a path at each intermediate node in the departure field to generate an accumulated departure time and intermediate node delay; and
   determining the propagation delay at the destination node based on the link propagation delay by determining an arrival time at which the ping packet arrives at the destination node, extracting the accumulated departure time and intermediate node delay from the departure time field, and subtracting the extracted accumulated departure time and intermediate node value from the arrival time,
   wherein an amount of time for each intermediate node delay and the departure time are accumulated into a single amount of lime the single amount of time is recorded in the departure time field as the accumulated departure time and intermediate node delay, and the propagation delay is determined by subtracting only the single amount of time from the arrival time.

14. The method of claim 13, further comprising:
   determining transmission speed of the ping packet;
   determining a distance between the source node and at least one of the destination node and the one or more intermediate nodes, based on the transmission speed and the propagation delay;
   establishing a valid distance of digital rights management of content based on the determined distance; and
   configuring the content for sending or replaying within the valid distance,
   wherein each node of the packet network computes and accumulates the link propagation delay for the link with an adjacent node.

15. The method of claim 13, wherein, when the ping packet passes through a plurality of intermediate nodes, the link propagation delay is successively accumulated and recorded in the ping packet at each intermediate node.

16. The method of claim 13, wherein the determining the propagation delay at the destination node based on the link propagation delay comprises:
   receiving the ping packet;
   extracting accumulated link propagation delays from the ping packet; and
   determining the link propagation delay as the propagation delay.

17. A propagation delay determining node system in a packet network, the system comprising:
   a first node unit for sending a ping packet whose destination address is a second node, and storing a departure time of the ping packet in a departure time field of the ping packet, the departure time comprising a time at which the ping packet is transmitted;
   a third node unit for determining an intermediate node delay of the ping packet, and for recording, at the third node, the intermediate node delay in the departure time field of the ping packet to generate an accumulated departure time and intermediate node delay; and
   a second node unit for receiving the ping packet and for determining the propagation delay using the intermediate node delay included in the ping packet,
   wherein the second node unit comprises:
   an arrival time determiner for determining an arrival time that the second node receives the ping packet;
   a departure time extractor for extracting the accumulated departure time and intermediate node delay from the ping packet; and
   a propagation delay determiner for determining the propagation delay by subtracting the extracted accumulated departure time and intermediate node delay from the arrival time.
   wherein an amount of lime for each intermediate node delay and the departure time are accumulated into a single amount of time. the single amount of time is recorded in the departure time field as the accumulated departure time and intermediate node delay, and the propagation delay is determined by subtracting only the single amount of time from the arrival time.

18. The system of claim 17, wherein the first node unit comprises:
   a departure time determiner for determining the departure time that the ping packet departs;
   a departure time recorder for recording the departure time in the departure time field of the ping packet; and
   a ping packet sender for sending the ping packet to the second node.

19. The system of claim 17, wherein the third node unit comprises:
   a third node departure time determiner for receiving the ping packet and determining a third node arrival time;
   a third node departure time determiner for determining a third node departure time that the ping packet departs;
   a third node delay determiner for determining the intermediate node delay using a difference between the third node departure time and the third node arrival time; and
   a third node delay recorder for recording the intermediate node delay in an intermediate node delay field included in the ping packet.

20. The system of claim 17, wherein a distance between the first node unit and the second node unit is determined by the second node unit based on the transmission speed of the ping packet and the propagation delay, a valid distance of digital rights management of content is established based on the determined distance, and the content is configured for sending or replaying within the valid distance.

* * * * *